Oct. 5, 1926. 1,601,897
R. E. WILEY ET AL
APPARATUS FOR PRODUCING GRANULAR PRODUCTS
Filed July 9, 1925 2 Sheets-Sheet 1

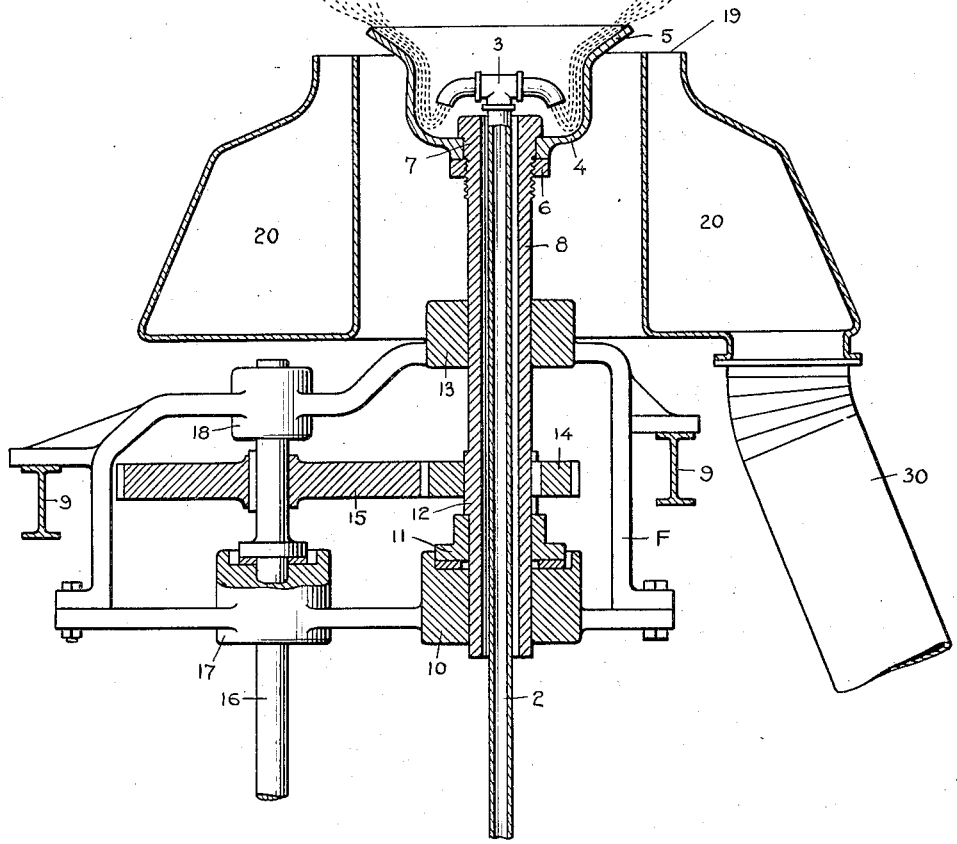

Patented Oct. 5, 1926.

1,601,897

UNITED STATES PATENT OFFICE.

ROY E. WILEY, OF PLAINFIELD, AND CARL E. MENSING, OF SOMERVILLE, NEW JERSEY.

APPARATUS FOR PRODUCING GRANULAR PRODUCTS.

Application filed July 9, 1925. Serial No. 42,344.

This invention relates to an apparatus designed for the treatment of a flowing mass, such as a body of fused alkali, to reduce the same to a granular condition. While we have herein described the apparatus as used in connection with the reduction of a mass of caustic soda to the form of readily separable, substantially dry particles, we wish it to be understood that the apparatus is not limited in its use to the handling or treatment of this particular chemical, as it may be employed for the treatment of other materials for which it might be found adaptable and desirable.

In the copending application of Roy E. Wiley, filed July 9, 1925, Serial No. 42,343, for granular product and method of producing same, we have shown and described the present apparatus for carrying out the invention of said Wiley application and make no claim herein to the product or method set forth in that application, as the present case is directed to an apparatus.

For the sake of a clear understanding we will confine the description in the present case to the treatment of caustic soda. In carrying out our invention it is our purpose to provide a simple, compact, efficient apparatus through the medium of which treatment of the material and the preparation of the product may be speedily, economically and conveniently accomplished.

Before entering into a detailed description of the present apparatus, we will briefly state that it embodies a suitable housing or chamber containing a centrifugal device and having provision for the delivery of air blasts into contact with the fused caustic soda thrown out by the centrifugal device, and to which device it has been fed from the still by a suitable pumping mechanism. By subjecting the fused mass to centrifugal action and to the action of blasts of cooled air, such mass is reduced to particles of granular, globular or spherical form and provision is made for collecting such particles in suitable containers. Furthermore, provision is also made for conducting the air currents used in cooling and diffusing the particles of the mass out from the housing or chamber after they have done their work, and passing said air currents through suitable cooling devices and then back to the housing or chamber again. Provision is also made for supplying an inert inorganic powder such as talc to the caustic soda being treated in the chamber in order to coat the particles of caustic soda and thus reduce or retard the hygroscopic tendency of the caustic soda particles. The caustic soda when treated in this apparatus will be reduced to a mass of separate readily-flowing particles of granular or substantially globular or spherical form, which will not cake or pack to the degree incident to ground or flaked caustic soda, and which, if it should cake to a solid mass, may be readily crumbled or disintegrated to assume the granular form, a capability not incident to the flaked or powdered caustic soda now on the market.

In the accompanying drawings:

Fig. 2 is an enlarged vertical sectional view taken through the centrifugal distributor mechanism of the apparatus.

Figure 1:
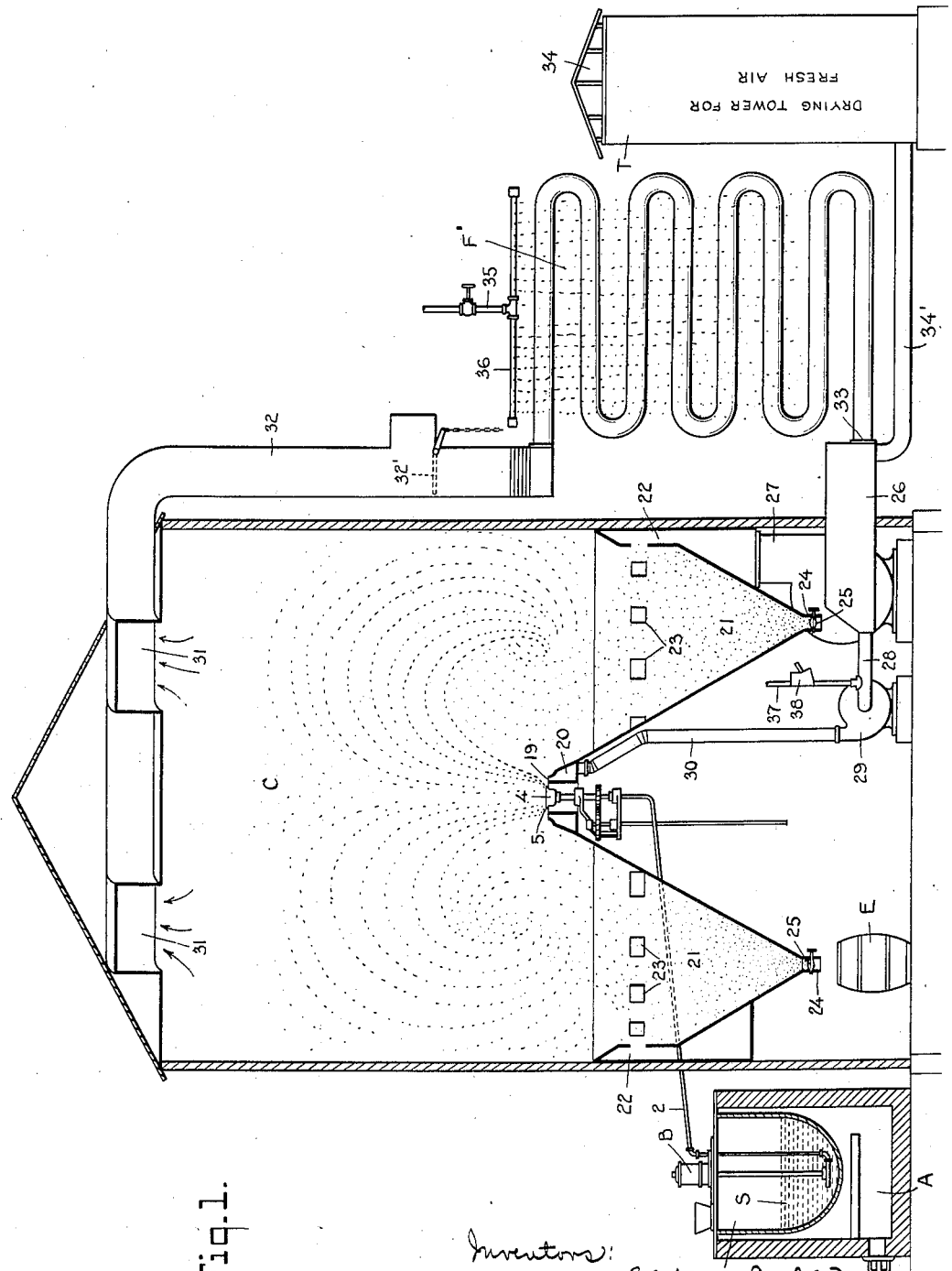
Fig. 1 is a view partly in section and partly in elevation of an apparatus for carrying out our invention.

Referring now to the accompanying drawings in detail, the material to be treated, such as the caustic soda, indicated in Fig. 1 as S is placed in the pot 1 of a heater A, here conventionally illustrated, and is reduced to a fused or fluid form. From the still the fused or fluid-like caustic soda is forced, by a centrifugal pump B, of any well known form, through the supply pipe 2 to the nozzle head 3 carried at the upper end of the pipe 2 and disposed within the confines of the centrifugal distributor bowl 4, as clearly shown in Fig. 2. The upper portion of the wall of the distributor bowl is outwardly flared as at 5 to the proper degree to give adequate distribution, as hereinafter described. The distributor bowl is secured to the upper end by a threaded locking ring 6 at the upper shouldered end 7 of the revolving sleeve 8, so that the bowl will turn or revolve with the sleeve when the latter is driven. The upper vertical section of the supply pipe 2 extends through this sleeve 8, as clearly shown in Fig. 2. This sleeve 8 is mounted to revolve on bearings carried by the frame F which also acts to support the drive gearing. The frame F may be of any suitable form, and in the present instance is mounted upon I-beams 9—9 and has a foot block 10 supporting a thimble 11 on which rests the shoulder 12 of the sleeve 8. The upper portion of the frame carries a collar 13 through which the sleeve extends, the lower portion of the sleeve also extending through the bore of the foot block 10, as will be seen by reference to Fig. 2. Keyed on the shoulder portion 12 of the sleeve is a pinion 14 meshing with the gear 15 splined on the drive shaft 16, the bearings for the drive shaft 16 being shown as carried by the frame as at 17 and 18. This drive shaft 16 is driven from any suitable motor, such as a small electric motor (not shown).

From the apparatus thus far described, it will be seen that when the centrifugal pump B is in operation pumping the caustic soda S, and the centrifugal distributing bowl is revolving through the operation of the driving mechanism thereof, the fused fluid-like caustic soda will flow through the nozzle head 3 into the distributing bowl 4 and thru the rapid revolution of the latter will be moved upward in the form of a thin film to the outer extremity of the bowl from which it is thrown horizontally by centrifugal force into a strong blast of cold dry air issuing from the open end or mouth 19 of the air chamber 20 surrounding the distributing bowl. The combined action of the distributing bowl and the blast of air cause the material to be thrown upward and outward into the large chamber C in the form of a spray or fountain.

As will be seen by reference to Fig. 1, this air chamber 20 is located above and centrally of the caustic soda collecting hopper 21, which extends horizontally of the chamber C, and the top portion of this hopper is formed by a circular air duct 22 having at suitable intervals air ports 23. The walls of the hopper converge downwardly, and the lower end of such hopper is provided, also at suitable intervals, with discharge spouts 24 each controlled by a valve 25 of any suitable form.

It is obvious from the construction of the apparatus as shown in Fig. 1 that it is the purpose to supply a blast of air directly at and beneath the material issuing from the distributing bowl to toss such material upward and outward in the form of a spray, and that it is also the purpose to supply additional currents of air through the ports 23 to supply additional cold dry air into the chamber C in such quantities as may be necessary for carrying away the heat given up or driven off by the falling particles of caustic soda on cooling in contact with the upward moving currents of air. Of course the air blast may be supplied in any suitable manner, and in the present instance we have shown an air box 26 connected with the blower 27 which supplies air to the circular air duct 22 forming the top of the hopper, and this air box 26 is also connected by the pipe 28 with a second blower 29 which supplies air to the air chamber 20 through the pipe 30. The blower 27 supplies air under low pressure to cause mild currents of air in chamber C, and blower 29 supplies air at a much higher pressure into chamber 20 for the pupose of making a strong blast where material leaves the bowl. As the air passes from the circular air duct 22 through the ports 23 into the chamber C, and also through the air chamber 20 surrounding the centrifugal distributor bowl, it strikes the material coming from the distributor bowl and tosses or sprays the same upward or outward in the chamber, causing the now separated particles of materials to remain suspended in the air for a sufficient length of time to cool such particles by driving off the heat, the latter finally falling or dropping into the hopper 21 and may be drawn off through the spouts 24 into suitable containers, such as barrels E.

Now it is important to note that as the material issues from the distributing bowl under whirling centrifugal action and is subjected to the blasts of air, the mass of material will be separated in the form of a spray and the particles thereof will, under the combined centrifugal and air action as described, assume the form of small granules or spherical or globular particles, examination showing that these particles are in the form of practically perfect little spheres or globules.

The air after performing its function within the large chamber or housing C passes through air ports 31 beneath the roof of the chamber C into the air tube 32 which communicates at its lower end with the cooling device F, which may be of any suitable character, in the present instance a cooling coil, and at its lower end the cooling coil leads into the air box 26, as shown at 33. In order to insure an adequate supply of dry air for the operation, we provide any suitable arrangement, such for example as an air drying tower T, packed with any suitable dehydrating material, such for example as calcium chloride. This tower is preferably provided with an air intake in the form of the ventilated or shuttered roof 24, and the air drawn into the tower passes out at the bottom of the latter through the air duct 34' to the air box 26, and from which it, of course, is drawn by the blowers into the chamber C.

It will be noted that we also provide the exhaust air flue 32 with a suitable damper 32' which, when opened, will permit the escape of the air drawn from the chamber C before it can pass to the cooling coil F. We provide this damper because in some instances, particularly at the beginning of the operation of treating the material, the air fed into the chamber C may carry too great a quantity of moisture and consequently owing to the hygroscopic tendencies of the material being treated would become absorbed by the latter, thereby causing the material passing into the collecting hopper to possess more moisture than might be desirable. By providing the damper the air being exhausted from the chamber C and carrying this excess amount of moisture may be discharged into the atmosphere. In practice it is only necessary to use this damper for a short time, for example at the beginning of the operation, and it may then be closed down and the air passed direct into the cooling coils and thence on back into the system. Cold water from any suitable source may be passed through the valve pipe 35 and sprayed through the perforated pipe 36 on the coils of the cooling device F for the purpose of cooling down the air passing through the coils. The cooled air passing from the coils is thus passed into the air box 26 and returned to the apparatus in cooled condition to again perform the function of treating the sprayed material in the chamber C.

During the operation of treating the fused material to reduce it to its granular form, inert inorganic material, such as powdered talc, may advantageously be supplied for the purpose of mixing with the caustic soda, thereby coating the granular particles to reduce or retard the moisture absorbing capabilities of such particles as before mentioned, and for this purpose such inert inorganic material in powder form may be fed from a suitable source of supply (not shown) through the pipe 37 controlled by any suitable measuring device 38, into the air pipe 28 leading to the blower 29, and being drawn into the blower to pass with the air through the pipe 30 into the air chamber 20 surrounding the distributor bowl and will be blown through the mouth 19 of this air chamber 20 into direct contact with the caustic soda material as it issues from the centrifugal distributor bowl, and will intimately mix therewith, floating or being suspended in the air in admixture with the material during the operation of cooling and drying the latter. Thus when the material settles or falls down into the hopper and into the barrels or other receptacles E the small globular particles will be coated with the talc or other inert inorganic powder for the purpose before mentioned.

While we have herein shown and described one embodiment of our invention, we wish it to be understood that we do not limit ourselves to all the precise details herein set forth by way of illustration, as modification and variation may be made without departing from the spirit of the invention or exceeding the scope of the appended claims.

We claim:

1. An apparatus of the class described comprising a distributing device, means for supplying a flowing mass of the material to be treated to the distributing device from which it is thrown in the form of a spray, means for supplying an air blast to the spray of material, the latter being thereby reduced to granular form, and means for cooling the air blast before it is supplied to said spray of material.

2. An apparatus of the class described comprising a centrifugal distributor, means for supplying a fused mass of flowing material to the distributor from which it is ejected under pressure in a spray-like form, means for subjecting the spray-like form of material to the action of an air blast to cool such material, particles of the latter assuming a granular form, and means for cooling the air blast before it is directed into the material.

3. An apparatus of the class described comprising a revolving distributor, means for supplying a fused flowing mass of material to be treated to the distributor and from which with the revolution of the distributor the mass is ejected in a spray-like form, means adjacent to the distributor for subjecting the spray-like mass to the action of a cool air blast and means for again supplying cool air to the falling spray at a point below the distributor.

4. An apparatus of the class described comprising a revolving distributor, a pumping device for supplying the material to be treated under pressure to the distributor and from which it is ejected in spray-like form, means for supplying air under pressure to the spray of material to cool the latter and means for cooling the air so supplied.

5. An apparatus of the class described comprising a housing, a material distributor located therein, means for supplying material to the distributor, means for operating the distributor to discharge the material therefrom, devices for supplying air under pressure to the material coming from the distributor, a receptacle for collecting the material as it falls after leaving the distributor and means for cooling the air before it is supplied to said material.

6. An apparatus of the class described comprising a chamber, a distributor located therein, a collecting receptacle surrounding the distributor, means for supplying the material to be treated to the distributor, an air chamber located adjacent to the distributor, means for supplying air to the air chamber and through which chamber the air passes into contact with the material leaving the distributor, an air exit from the first mentioned chamber, a conduit leading from said exit to said second chamber, and means in said conduit for cooling the air before it returns to the chamber.

7. An apparatus of the class described comprising a chamber, a distributor located therein, means for supplying material to be treated to the distributor and from which it issues in a spray-like form, means for supplying air under pressure to the material as it leaves the distributor and means for supplying an inert powdered material to the chamber in admixture with the material leaving the distributor.

8. An apparatus of the class described comprising a chamber, a centrifugal distributor located therein, a pump for supplying a body of fused flowing material to the distributor and from which distributor the material is discharged upward and outward in the chamber, means located adjacent the distributor for supplying air under pressure to the material as it leaves the distributor, a collecting receptacle located below the distributor and having air ports in the walls thereof, means for supplying air to said ports and into contact with the material falling into the collecting receptacle, an exit for the air from the first mentioned chamber and means for cooling the air admitted to the chamber.

9. An apparatus of the class described comprising a chamber, a centrifugal distributor located therein, means for supplying a body of fused flowing material to the distributor, the distributor being adapted to discharge the material upwardly and outwardly in the chamber, means located adjacent the distributor for subjecting the material as it leaves the distributor to air under pressure, means for cooling the air before it is directed against said material, said chamber having an exit for the air, and a conduit leading from said exit serving to return the air to the chamber, the conduit including means for cooling the air before it is returned to the chamber.

10. An apparatus of the class described comprising a chamber, a centrifugal distributor located therein, means for supplying a body of fused flowing material to the distributor, the distributor being adapted to discharge the material upwardly and outwardly in the chamber, means located adjacent the distributor for subjecting the material as it leaves the distributor to air under pressure, means for cooling the air before it is directed against said material, said chamber having an exit for the air, a conduit leading from said exit serving to return the air to the chamber, the conduit including means for cooling the air before it is returned to the chamber, and selectively operable means in said conduit for discharging the air into the outside atmosphere.

11. An apparatus of the class described comprising a chamber, a centrifugal distributor located therein, means for supplying a body of fused flowing material to the distributor, the distributor being adapted to discharge the material upwardly and outwardly in the chamber, means located adjacent the distributor for subjecting the material as it leaves the distributor to air under pressure, means for cooling the air before it is directed against said material, said chamber having an exit for the air, a conduit leading from said exit serving to return the air to the chamber, the conduit including means for cooling the air before it is returned to the chamber, and means for admitting fresh air into said chamber along with the air being returned thereto by said conduit.

12. An apparatus of the class described comprising a chamber, a centrifugal distributor located therein, means for supplying a body of fused flowing material to the distributor, the distributor being adapted to discharge the material upwardly and outwardly in the chamber, means located adjacent the distributor for subjecting the material as it leaves the distributor to air under pressure, means for cooling the air before it is directed against said material, said chamber having an exit for the air, a conduit leading from said exit serving to return the air to the chamber, the conduit including means for cooling the air before it is returned to the chamber, a collecting hopper in the chamber, and means for supplying an inert powder to the material in the chamber before it gravitates to said hopper.

Signed at New York in the county of New York and State of New York this 2nd day of July A. D. 1925.

ROY E. WILEY.
CARL E. MENSING.